(12) United States Patent
Tackett et al.

(10) Patent No.: US 6,226,912 B1
(45) Date of Patent: May 8, 2001

(54) PLACARD SYSTEM FOR TRANSPORTABLE STORAGE TANKS

(76) Inventors: Morse Tackett; Loraine G. Tackett, both of 3566 Castle Rd., North Branch, MI (US) 48461

( * ) Notice: Subject to any disclaimer, the term of this patent is extended or adjusted under 35 U.S.C. 154(b) by 0 days.

(21) Appl. No.: 09/283,901

(22) Filed: Apr. 1, 1999

(51) Int. Cl.[7] ........................................ G09F 3/10
(52) U.S. Cl. .......................... 40/673; 40/306; 40/640; 40/665
(58) Field of Search ..................... 40/673, 665, 306, 40/662, 664, 640, 586, 331, 332; D23/202, 205, 206; 24/2.5

(56) References Cited

U.S. PATENT DOCUMENTS

| | | | |
|---|---|---|---|
| 616,653 | * 12/1898 | Bowen | 40/665 |
| 2,201,139 | 5/1940 | Ivey . | |
| 3,461,584 | 8/1969 | Wilson . | |
| 3,510,975 | 5/1970 | Lowmaster . | |
| 3,701,210 | 10/1972 | Smith . | |
| 3,958,350 | 5/1976 | Garson . | |
| 4,094,083 | 6/1978 | Fund . | |
| 4,106,229 | 8/1978 | Schmid . | |
| 4,246,712 | * 1/1981 | Vander Wall | 40/316 |
| 4,760,944 | * 8/1988 | Hughes | 224/609 |
| 5,226,251 | 7/1993 | Webb . | |
| 5,255,464 | 10/1993 | Marecek . | |
| 5,402,592 | 4/1995 | Caveney et al. . | |
| 5,503,114 | * 4/1996 | Castagna | 40/665 X |

* cited by examiner

*Primary Examiner*—Terry Lee Melius
*Assistant Examiner*—James M. Hewitt
(74) *Attorney, Agent, or Firm*—Reising, Ethington, Barnes, Kisselle, Learman & McCulloch, P.C.

(57) ABSTRACT

A placarding apparatus for use in connection with a transportable cylindrical storage tank of the type that includes a pair of opposing ends with an upper lifting lug and a lower pair of feet at each end. The placarding apparatus includes a first placard assembly that provides signage at each end of the storage tank and a second placard assembly that provides signage at each side of the tank. The first placard assembly includes a placard and strap assembly that connects the placard between one of the lifting lugs and one of the pairs of opposing feet. The strap assembly has a first portion that extends upwardly at one end from an upper aperture in the placard to the lifting lug at that end. It also includes a lower strap portion that extends downwardly from a lower aperture in the placard to a pair of strap segments that connect to each of the two feet at that end of the storage tank. The first placard assembly also includes an adjustment mechanism that permits adjustment of the overall length of the strap assembly. The second placard assembly includes at least one placard and a strap assembly that extends around the cylindrical portion of the storage tank, with the ends of the strap assembly being connected together. Each of the strap assemblies includes a stop located above and below the placard's upper and lower apertures, respectively, to prevent movement of the placard along the length of the strap assembly.

24 Claims, 2 Drawing Sheets

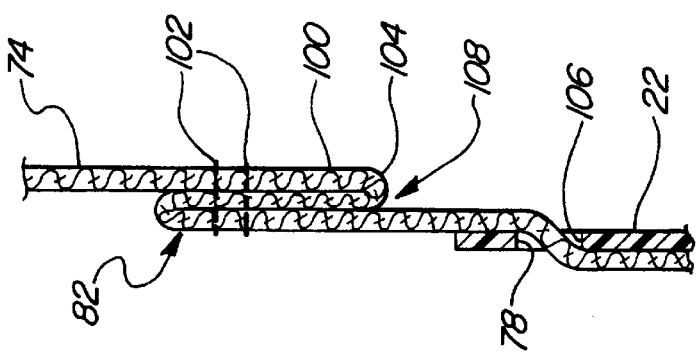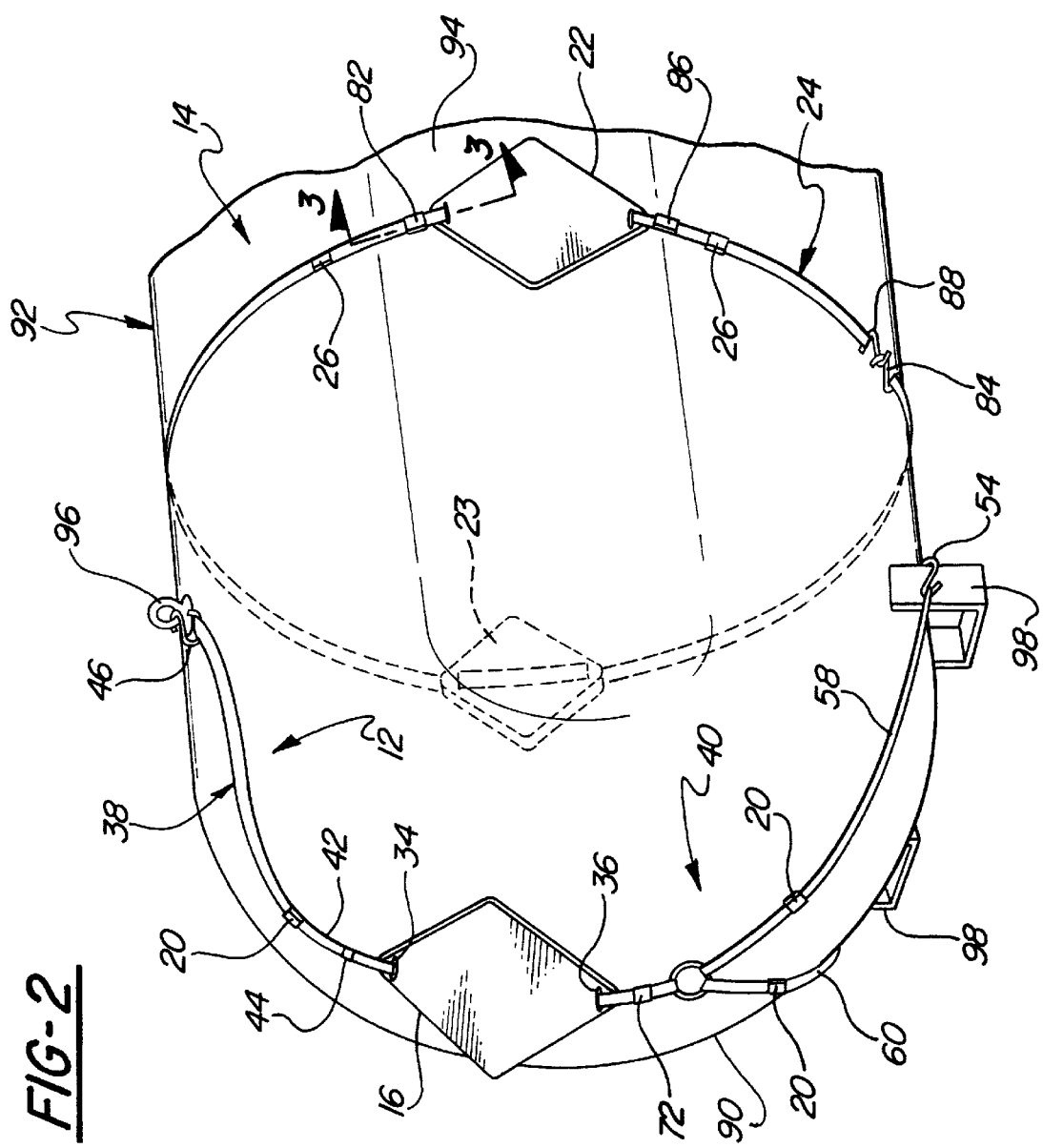

PLACARD SYSTEM FOR TRANSPORTABLE STORAGE TANKS

TECHNICAL FIELD

The present invention relates to placard systems used for transportable storage tanks to identify, for example, hazardous materials contained within the storage tanks.

BACKGROUND OF THE INVENTION

Current government regulations require placarding of flammable and otherwise hazardous materials during transportation. For tankers and storage tanks transported inside of a service truck, placards are typically required at each side and each end of the vehicle. Examples of such placarding can be found in U.S. Pat. No. : 4,106,229, issued Aug. 15, 1978 to H. F. Schmid; U.S. Pat. No. 4,094,083, issued Jun. 13, 1978 to H. Fund; U.S. Pat. No. 3,510,975, issued May 12, 1970 to W. J. Lowmaster, and U.S. Pat. No. 3,958,350, issued May 25, 1976 to J. Garson. Each of these patents is directed to a generally permanent sign assembly that is bolted or otherwise similarly attached to the vehicle.

For storage tanks transported on a tank setting or other flat-bed trailer, the tank itself must typically be placarded at each side and each end of the tank. For these storage tanks, the placarding requirements may only be temporary; that is, during transportation of the tanks. In these instances, the permanent signage disclosed in the above-noted patents may not be desirable. Various arrangements have been proposed for temporary placarding of vehicles themselves. See, for example, U.S. Pat. No. : 5,955,464, issued Oct. 26, 1993 to R. L. Marecek; U.S. Pat. No. 3,701,210, issued Oct. 31, 1972 to G. E. Smith; and U.S. Pat. No. 3,461,584, issued Aug. 19, 1969 to M. E. Wilson. In the Marecek patent, there is disclosed a removable tailgate sign for use on a vehicle tailgate of, for example, a pickup truck. The sign wraps around the tailgate and can be secured using any of a number of different fastening arrangements. The Smith patent discloses a temporary vehicle marking that is designed to attach on top of the hood, roof, or trunk of an automobile. The sign is attached using straps and clips, with the clips being attachable over the edges of a vehicle body panel and the straps being adjustable so that they may be tensioned to tightly retain the vehicle marker in place. The Wilson patent discloses a sign holder that attaches over a vehicle door and that is otherwise similar to the vehicle marker disclosed by Smith.

While suitable for their intended purpose, the signage systems disclosed in these patents are not suitable for transportable storage tanks for a number of reasons. First, such tanks do not have individual body panels to which the above-noted signage systems can be attached. Rather, they typically include only an upper lifting lug and a pair of lower feet at each end of the tanks. Secondly, as mentioned above, current government regulations typically require placarding at each side and each end of the storage tank. To address these unique requirements, individual magnetic placards have sometimes been utilized. These placards include a flexible magnetic substrate with a suitable warning or other marking indicia printed thereon. The placards are then simply attached to the storage tanks at the appropriate locations and are retained in place by the magnetic attraction of the substrate to the metal storage tank wall. However, these placards have been found to detach at higher speeds, thereby defeating their purpose and exposing the carrier to the risk of substantial fines.

Accordingly, there exists a need for a placard system that can be removably attached to a storage tank which overcomes the above-noted disadvantages of currently existing arrangements.

SUMMARY OF THE INVENTION

The present invention provides a placarding apparatus for use in connection with a cylindrical storage tank of the type that includes a pair of opposing hemispherical ends with an upper lifting lug and lower pair of feet at each of the ends. In accordance with one aspect of the invention, the placarding apparatus includes a placard having first and second apertures located at respective upper and lower portions of the placard, and a strap assembly that connects the placard between one of the lifting lugs and one of the pairs of opposing feet at one end of the storage tank. The strap assembly includes first and second strap portions that are respectively threaded through the first and second apertures of the placard. The first strap portions extends upwardly from the first aperture at the upper portion of the placard and attaches to the storage tank's lifting lug. The second strap portion extends downwardly from the second aperture at the lower portion of the placard and includes first and second distal ends, each of which can be connected to one of the two feet at that end of the storage tank. The placarding apparatus also includes an adjustment mechanism for the strap assembly which permits adjustment of the overall length of the strap assembly to thereby permit attachment and removal of the placarding apparatus to different size storage tanks. The adjustment mechanism also permits the position of the placard on the storage tank to be adjusted as desired.

In accordance with another aspect of the invention, there is provided a placarding apparatus that can be attached about the cylindrical portion of the storage tank. The placarding apparatus includes a placard having a first aperture located at an upper portion of the placard and a second aperture located at a lower portion of the placard, as well as a strap assembly having first and second strap portions respectively threaded through the first and second apertures of the placard. The first strap portion extends upwardly from the first aperture and terminates at a first distal end. The second strap portion extends downwardly from the second aperture and terminates at a second distal end. The first and second distal ends of the strap portions are configured to be removably attached to one another when the placarding apparatus is positioned about the cylindrical portion of the storage tank. The placarding apparatus also includes an adjustment mechanism that permits adjustment of the overall length of the strap assembly. In this way, the strap assembly can be wrapped around the cylindrical portion of the storage tank with the first and second distal ends connected together, following which the adjustment mechanism can be used to tighten the strap assembly in place about the storage tank. A second placard can be similarly attached to the strap assembly, so that a single strap assembly can be used to display placards at each side of the cylindrical portion of the storage tank.

To prevent the placards from sliding upwardly or downwardly along the strap assembly, a pair of stops can be formed in the strap assembly both above the first aperture at the upper portion of the placard and below the second aperture at the lower portion of the placard. These stops can be formed by folding back a portion of the strap upon itself and securing the folded strap portion in this configuration by sewing or otherwise. This folded portion is made thicker than the apertures, which prevents the placards from slipping past the stops.

DESCRIPTION OF THE DRAWINGS

A preferred exemplary embodiment of the invention will now be described in conjunction with the appended drawings, wherein like designations denote like elements, and wherein:

FIG. 2 is a perspective view showing the attachment of the placarding system of FIG. 1 to a cylindrical storage tank; and FIG. 3 is a cross-sectional view of the stops used in the strap assembly of FIG. 1.

DESCRIPTION OF THE PREFERRED EMBODIMENT

Figure 1:
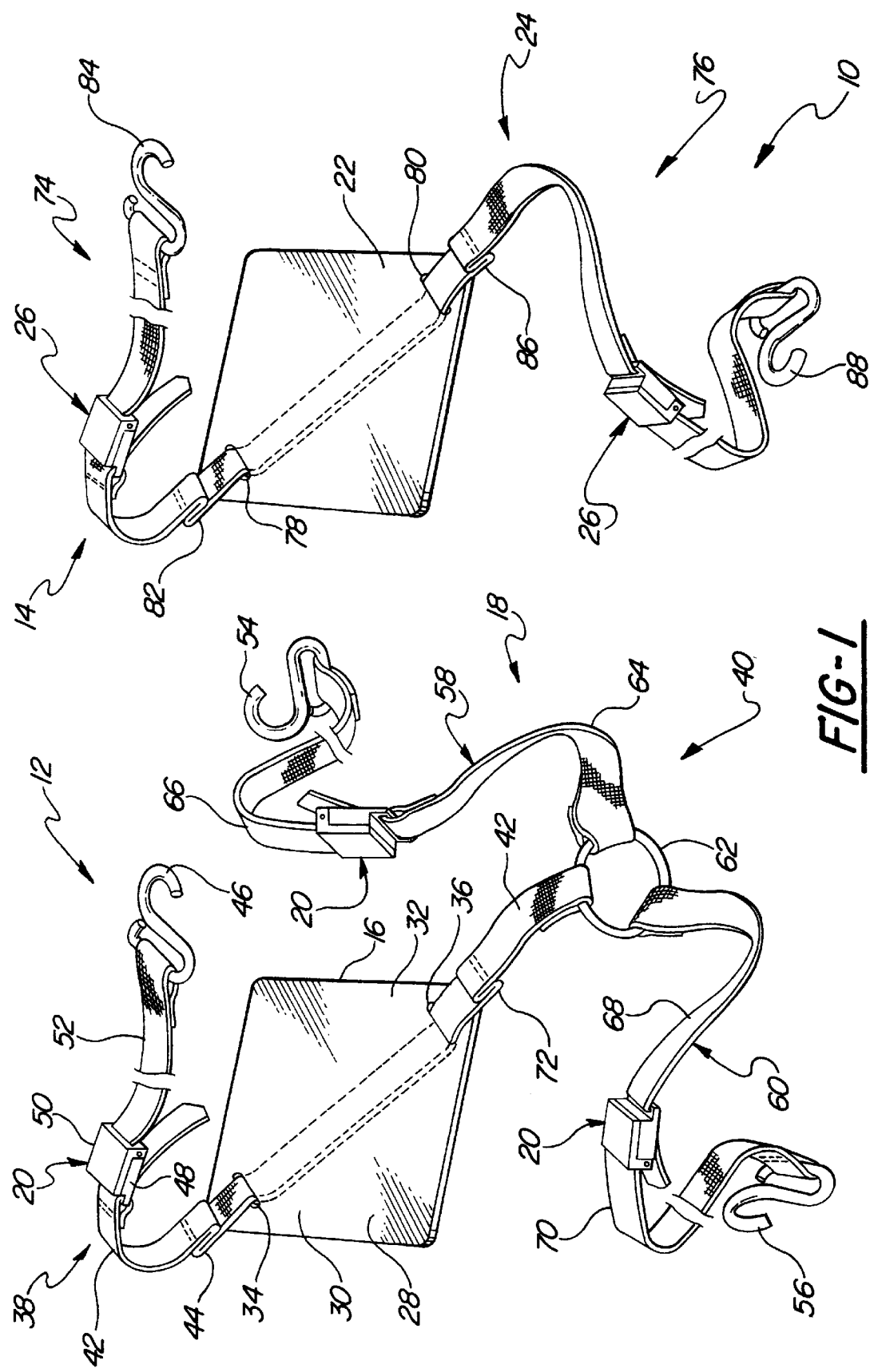
FIG. 1 is a perspective view of the basic components of a preferred exemplary embodiment of a placarding system of the present invention.

Referring to FIG. 1, there is shown the basic components of a placarding apparatus 10 constructed in accordance with the present invention. In general, placarding apparatus 10 includes a first placard assembly 12 and a second placard assembly 14. Placard assembly 12 is used for providing signage at an end of a typical transportable storage tank. It includes a placard 16, strap assembly 18, and one or more adjustment mechanisms 20. Similarly, placard assembly 14 is used to mount a placard at one or both sides of the storage tank. It includes a placard 22, strap assembly 24, and at least one adjustment mechanism 26.

Placard 16 includes a front side 28 upon which a warning symbol, text, or other indicia- is printed. It also includes an upper portion 30, a lower portion 32, and upper and lower apertures 34, 36 located at the upper and lower portions 30, 32, respectively. Placard 16 can be made from standard sheet steel that is painted or otherwise protected against rust, with apertures 34, 36 being stamped or otherwise formed in a manner known to those skilled in the art. Strap assembly 18 comprises an upper portion 38 and a lower portion 40, each of which preferably includes at least one adjustment mechanism 20. Upper and lower strap portions 38, 40 are preferably integrally joined as unitary portions of a single section of strap 42. This can be accomplished by threading the strap 42 into the upper aperture 34 from the front side 28 of placard 16, then down along the back side of placard 16, and finally out through the lower aperture 36.

In addition to adjustment mechanism 20, upper strap portion 38 includes a stop 44 and an end hook 46 at its distal end. Stop 44 comprises a section of strap 42 that is folded over upon itself and permanently secured in that conformation via stitching. The construction and use of stop 44 will be described in greater detail below in connection with FIG. 3. Adjustment mechanism 20 is used to vary the length of the strap assembly between stop 44 and hook 46. It includes a base member 48 and upper closing member 50 which pivots at one end of base member 48. Adjustment mechanism 20 can be any of a number of widely known, commercially available quick-release clamps. One end of strap 42 extends through an aperture (not shown) in base member 48 and is folded back onto itself and secured by stitching. A second section of strap 52 extends between hook 46 and the upper clamp member 50. As will be known to those skilled in the art, when upper clamp member 50 is pivoted to its open position, strap 52 can be slid through adjustment mechanism 20 to the desired position, at which point upper clamp member 50 can be pivoted to its closed position which will prevent further movement of strap 52 relative to the adjustment mechanism.

The lower strap portion 40 extends between placard 16 and a pair of hooks 54, 56 which can be identical to hook 46. More specifically, lower strap portion 40 includes the lower end of strap 42, a pair of lower strap segments 58, 60, and a metal ring 62 that connects the distal end of strap 42 to the lower strap segments 58, 60. Strap segment 58 includes a first section of strap 64 connected between one of the adjustment mechanisms 20 and the metal link 62, as well as a second section of strap 66 that is connected between the adjustment mechanism 20 and the end hook 54. Similarly, strap segment 60 includes a first section of strap 68 connected between another of the adjustment mechanisms 20 and the metal link 62, as well as a second section of strap 70 that is connected between the adjustment mechanism 20 and end hook 56. Finally, the lower strap portion 40 also includes a stop 72 that can be identical to stop 44 of upper strap portion 38.

As mentioned above, the second placard assembly 14 can be used to secure one or more placards about the cylindrical body portion of a typical storage tank. Placard 22 can be identical to placard 16. As with the strap assembly 18, strap assembly 24 has upper and lower strap portions 74, 76, with upper strap portion 74 extending through an aperture 78 in placard 22 and lower portion 76 extending downwardly through an aperture 80 in the lower portion of placard 22. The upper portion 74 can be identical to upper portion 38 of placard assembly 12 in that it includes an adjustment mechanism 26, stop 82, and end hook 84. These components can be identical to the corresponding components of FIG. 1 with the exception that the overall length of the upper strap portion 74 will typically be longer than the length of upper strap portion 38. Lower strap portion 76 can be identical to upper portion 74, including an adjustment mechanism 26, stop 86, and end hook 88.

Turning now to FIG. 2, the use of the first and second placard assemblies 12, 14 in connection with a typical storage tank 90 will now be described. As shown, the first placard assembly 12 is used to provide signage at one of the two hemispherical ends 90 of a typical storage tank 92. The second placard assembly 14 provides signage at a side of the cylindrical portion 94 of the tank 92. Although not shown, the placarding apparatus 10 will typically include a second placard assembly 12 at the opposite end of storage tank 92, as well as a second placard assembly 14 that provides signage at the opposite side of the cylindrical portion 94 of tank 92. Placard assembly 12 is connected between an upper lifting lug 96 and a pair of opposing feet 98 located at the bottom of storage tank 92. In particular, hook 46 of upper strap portion 38 is connected to lifting lug 96, while the hooks 54, 56 at the distal ends of lower strap portion 40 are each connected to one of the opposing feet 98. Once hooks 46, 54, and 56 are in place, the upper and lower strap portions 38, 40 are tightened using adjustment mechanisms 20.

Although only a single adjustment mechanism 20 could be utilized at, for example, the upper strap portion 38, it will be appreciated that by providing the three adjustment mechanisms shown, the position of placard 16 relative to the end 90 of storage tank 92 can be adjusted as desired. This allows placard 16 to be properly located on any of a variety of different sized storage tanks. Also, by inspection of FIG. 2, it will be appreciated that the use of the two lower strap segments 58, 60 that are connected to each of the opposing feet 98 work in conjunction with the upper strap portion 38 to provide a three-point connection of the end placard 16. This prevents shifting of placard 16 at the hemispherical end 90 of storage tank 92. Stoppers 44 and 72 of placard assembly 12 prevent placard 16 from shifting position along the length of strap 42. Being located just above upper aperture 34 and lower aperture 36, respectively, they limit movement of placard 16 to a small area between the stops.

Placard assembly 14 is connected to the cylindrical portion 94 of storage tank 92 by wrapping the strap assembly 24 around the cylindrical portion 94 and connecting the end hooks 84, 88 together, as shown. Then, one or both adjustment mechanisms 26 are tightened to retain placard 22 firmly in place. By suitable tightening of the adjustment mechanisms 26, the inward pressure exerted by strap assembly 24 provides sufficient friction to prevent placard assembly 14 from rotating under the weight of placard 22. It will be appreciated that, while two adjustment mechanisms 26 are shown, only one such adjustment mechanism is required. Preferably, however, a second placard 23 is connected to strap assembly 24 in the same manner as placard 22, with the second placard being located at the opposite side of the cylindrical portion 94 of storage tank 92. Then, using the two adjustment mechanisms 26, the relative positions of the two placards can be adjusted. Also, the weight of the second placard offsets the weight of placard 22, thereby eliminating any tendency of placard assembly 14 to rotate. As with placard 16, placard 22 is limited in movement to a small area due to stops 82 and 86.

Referring now to FIG. 3, the construction of stop 82 will now be described and it will be appreciated that an identical construction can be used for the other stops 44, 72, and 86. As shown, stop 82 is formed by folding a section of upper strap portion 74 back onto itself to thereby create an overlapping area 100 having a thickness that is greater than the width of aperture 78. The overlapping portion 100 is permanently secured in this configuration by sewing the overlapping sections of strap portion 74 together via stitching 102. Preferably, this stitching is sewn at the portion of overlapping area 100 that is located farthest from placard 22. This permits partial separation of stop 82 at an end 104 so that if the strap portion 74 slides along through aperture 78 of placard 22, the movement of stop 82 through aperture 78 can be limited not only by the relative thickness of stop 82 and aperture 78, but also by movement of a lower peripheral edge 106 of aperture 78 into the separable opening 108 of stop 82 where it is captured between the folds of stop 82 and limited from further movement by stitching 102. In this way, the size of aperture 78 could be made larger than the thickness of stop 82 so that different placards could be added and removed from strap assembly 24, with stop 82 still being capable of preventing movement of the placard 22.

It will thus be apparent that there has been provided in accordance with the present invention a placarding apparatus which achieves the aims and advantages specified herein. It will, of course, be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

What is claimed is:

1. A storage tank placarding apparatus for use with a storage tank having a pair of opposing hemispherical ends, a pair of opposing feet, and a lifting lug, the placarding apparatus comprising:

a generally rectangular placard having an upper corner, a lower corner, and an outer indicia-bearing surface, said upper corner of said placard being defined by a pair of downwardly-divergent edges of said placard and said lower corner being defined by a pair of upwardly-divergent edges, whereby said placard has a diamond shape when oriented with said upper corner located above said lower corner, said placard further having a first aperture located at said upper corner and a second aperture located at said lower corner below said first aperture;

a strap assembly having first and second strap portions connected to each other and being respectively threaded through said first and second aperture, said first strap portion extending upwardly from said first aperture at said upper corner, and said second strap portion extending downwardly from said second aperture at said lower corner, whereby said placard is positioned with said first aperture directly above said second aperture when said strap assembly is in a vertical orientation, said first and second strap portions respectively including a first and second distal end, said first distal end of said first strap portion being attachable to the lifting lug and said second distal end of said second strap portion being connectable to the pair of opposing feet; and an adjustment mechanism associated with said strap assembly and permitting adjustment of at least a portion of said strap assembly to thereby permit attachment and tightening of said placarding apparatus.

2. The placarding apparatus of claim 1, wherein said second strap portion is unitary with said first strap portion.

3. The placarding apparatus of claim 2, wherein each of said first and second strap portions further includes a stop adjacent said placard and located intermediate said ends, said stops being adapted to contain said placard within an area between said stops.

4. The placarding apparatus of claim 3, wherein said stops comprise folded sections of said strap portions.

5. The placarding apparatus of claim 1, wherein said second strap portion further includes a pair of straps depending from said second distal end, each of said straps having an end that is attachable to a different one of the pair of opposing feet.

6. The placarding apparatus of claim 5, wherein said adjustment mechanism is located at said first strap portion and wherein said pair of straps each includes an adjustment mechanism.

7. A storage tank placarding apparatus adapted for use about a cylindrical portion of a storage tank, the apparatus comprising:

a placard having an upper corner, a lower corner, and an outer indicia-bearing surface, said upper corner of said placard being defined by a pair of downwardly-divergent edges of said placard and said lower corner being defined by a pair of upwardly-divergent edges, whereby said placard has a diamond shape when oriented with said upper corner located above said lower corner, said placard further having a first aperture located at said upper corner and said second aperture located at said lower corner below said first aperture;

a strap assembly having first and second strap portions connected to each other and being respectively threaded through said first and second apertures, said first strap portion extending upwardly from said first aperture at said upper corner, and said second strap portion extending downwardly from said second aperture at said lower corner, whereby said placard is positioned with said first aperture directly above said second aperture when said strap assembly is in a vertical orientation, said first and second strap portions respectively including a first and second distal end, said first and second distal ends of said first and second strap portions being configured to be removably attached to one another when said placarding apparatus is positioned about the cylindrical portion of the storage tank; and an adjustment mechanism associated with said strap assembly and permitting adjustment of at least a portion of said strap assembly to thereby permit attachment and tightening of said placarding apparatus.

8. The placarding apparatus of claim 7, wherein said second strap portion is unitary with said first strap portion.

9. The placarding apparatus of claim 8, wherein each of said first and second strap portions further includes a stop adjacent said placard and located intermediate said ends, said stops being adapted to contain said placard to an area between said stops.

10. The placarding apparatus of claim 9, wherein said stops comprise folded sections of said strap portions.

11. The placarding apparatus of claim 7, further comprising a second placard attached to said strap assembly.

12. A placarded storage tank apparatus, comprising:
a storage tank having a pair of opposing hemispherical ends with a cylindrical portion disposed therebetween thereby forming an enclosure adapted to store fluids;
a placarding assembly having a placard, said placard having an upper and lower portion and an outer indicia-bearing surface, said placard including a first aperture located at said upper portion and a second aperture located at said lower portion below said first aperture;
said placarding assembly having a strap assembly that includes first and second strap portions respectively threaded through said first and second apertures, said first strap portion extending upwardly from said first aperture at said upper portion of said outer surface, said second strap portion extending downwardly from said second aperture at said lower portion of said outer surface, said first and second strap portions together include at least two ends adapted to operatively attach said placarding assembly to said storage tank; and
an adjustment mechanism associated with said strap assembly and permitting adjustment of at last a portion of said strap assembly to thereby permit attachment of said placarding assembly to said storage tank.

13. The placarded storage tank apparatus of claim 12, wherein said storage tank further includes a lifting lug and a pair of opposing feet, said first strap portion including a first one of said ends with said first end being attached to said lifting lug, and said second strap portion including second and third ones of said ends, with said second and third ends being attached to said pair of opposing feet.

14. The placarded storage tank apparatus of claim 13, wherein said second strap portion is unitary with said first strap portion.

15. The placarded storage tank apparatus of claim 14, wherein each of said first and second strap portions further includes a stop adjacent said placard, said stops being adapted to contain said placard to an area between said stops.

16. The placarded storage tank apparatus of claim 15, wherein said stops comprise folded sections of said strap portions.

17. The placarded storage tank apparatus of claim 13, wherein said second strap portion further includes a pair of straps, each of which includes one of said second and third ends attached to a different one of the pair of opposing feet.

18. The placarded storage tank apparatus of claim 17, wherein said adjustment mechanism is located at said first strap portion and wherein said pair of straps each includes an adjustment mechanism.

19. The placarded storage tank apparatus of claim 12, wherein said at least two ends include a first end and a second end, with said first end being located on said first strap portion and said second end being located on said second strap portion, and wherein said first and second ends are configured to be removably attached to one another when said placarding assembly is positioned about said cylindrical portion of said storage tank.

20. The placarded storage tank apparatus of claim 19, wherein said second strap portion is unitary with said first strap portion.

21. The placarded storage tank apparatus of claim 20, wherein each of said first and second strap portions further includes a stop adjacent said placard, said stops being adapted to contain said placard to an area between said stops.

22. The placarded storage tank apparatus of claim 21, wherein said stops comprise folded sections of said strap portions.

23. The placarded storage tank apparatus of claim 19, further comprising a second placard connected to said strap assembly.

24. The placarded storage tank apparatus of claim 23, wherein said adjustment mechanism is located at said first strap portion between said placards and wherein said strap assembly includes a second adjustment mechanism.

* * * * *

UNITED STATES PATENT AND TRADEMARK OFFICE
CERTIFICATE OF CORRECTION

PATENT NO. : 6,226,912 B1
DATED : May 8, 2001
INVENTOR(S) : Morse Tackett and Loraine G. Tackett It is certified that error appears in the above-identified patent and that said Letters Patent is hereby corrected as shown below:

Column 1,
Line 28, delete "5,955,464" and insert therefor -- 5,255,464 --.

Column 3,
Line 25, after "indicia" delete "-".

Column 6,
Line 3, delete "aperture" and insert therefor -- apertures --.

Signed and Sealed this

Ninth Day of July, 2002

*Attest:*

JAMES E. ROGAN
*Attesting Officer*     *Director of the United States Patent and Trademark Office*